US007249526B2

(12) United States Patent
Hsieh

(10) Patent No.: US 7,249,526 B2
(45) Date of Patent: Jul. 31, 2007

(54) TORQUE DETECTION DEVICE FOR POWER TOOLS

(76) Inventor: Chih-Ching Hsieh, No. 367, Pei-Yang Rd., Feng Yuan, Taichung (TW)

( * ) Notice: Subject to any disclaimer, the term of this patent is extended or adjusted under 35 U.S.C. 154(b) by 114 days.

(21) Appl. No.: 11/182,790

(22) Filed: Jul. 18, 2005

(65) Prior Publication Data

US 2007/0012121 A1 Jan. 18, 2007

(51) Int. Cl.
*G01L 5/24* (2006.01)

(52) U.S. Cl. ............................... 73/862.21; 73/862.22; 73/862.23

(58) Field of Classification Search . 73/862.21–862.23
See application file for complete search history.

(56) References Cited

U.S. PATENT DOCUMENTS 4,343,198 A * 8/1982 Jendrzejczyk .......... 73/862.042
5,181,575 A * 1/1993 Maruyama et al. ......... 173/180
5,303,601 A * 4/1994 Schonberger et al. .... 73/862.23
6,892,826 B2 * 5/2005 Giardino ........................ 173/1

* cited by examiner

*Primary Examiner*—Edward Lefkowitz
*Assistant Examiner*—Freddie Kirkland, III

(57) ABSTRACT

A torque detection device on a power tool includes at least one resistive strain gauge connected to an outer periphery of the shaft which is rotatably received in the barrel of the tool and driven by a motor. At least one conductive collar is mounted to the shaft and electrically connected to the at least one resistive strain gauge. A display device includes a display screen which is located at an outer periphery of the barrel and electrically connected to at least one signal member which is electrically connected to the at least one conductive collar. The at least one resistive strain gauge is deformed together with the deformation of the shaft so as to transfer the deformation of the at least one resistive strain gauge to electronic signals which are displayed by digits in the display screen.

6 Claims, 5 Drawing Sheets

B — B

TORQUE DETECTION DEVICE FOR POWER TOOLS

FIELD OF THE INVENTION

The present invention relates to a torque detection device for power tools and includes a display device for displaying the value of output torque.

BACKGROUND OF THE INVENTION

Conventional power tools powered by electric power are used in a wide range today and the electric power can be supplied by connecting a cable to a receptacle on the wall. The power can also be provided by a battery pack which is easily connected to the tool so that the tools can be portable without limitation by the length of the cable. The users use the tools to output a torque to tighten or loosen objects conveniently, however, the users do not know the exact output torque that is applied to the objects and the information of the value of the output torque is important when dealing with precision machine. Too much torque might hurt the objects on the precision machine, insufficient torque cannot meet requirements for the objects.

The present invention intends to provide a torque detection device for power tools wherein the exact output torque can be displayed in the display device on the tools so that the users can easily control the quality of work.

SUMMARY OF THE INVENTION

The present invention relates to a power tool with a torque detection device which comprises at least one resistive strain gauge connected to an outer periphery of the rotatable shaft in the barrel of the tool. At least one conductive collar is mounted to the shaft and electrically connected to the at least one resistive strain gauge. A display device is located at an outer periphery of the barrel and electrically connected to at least one signal member which is electrically connected to the at least one conductive collar. The deformation of the at least one resistive strain gauge is transferred into digits to show the output torque in the display screen.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
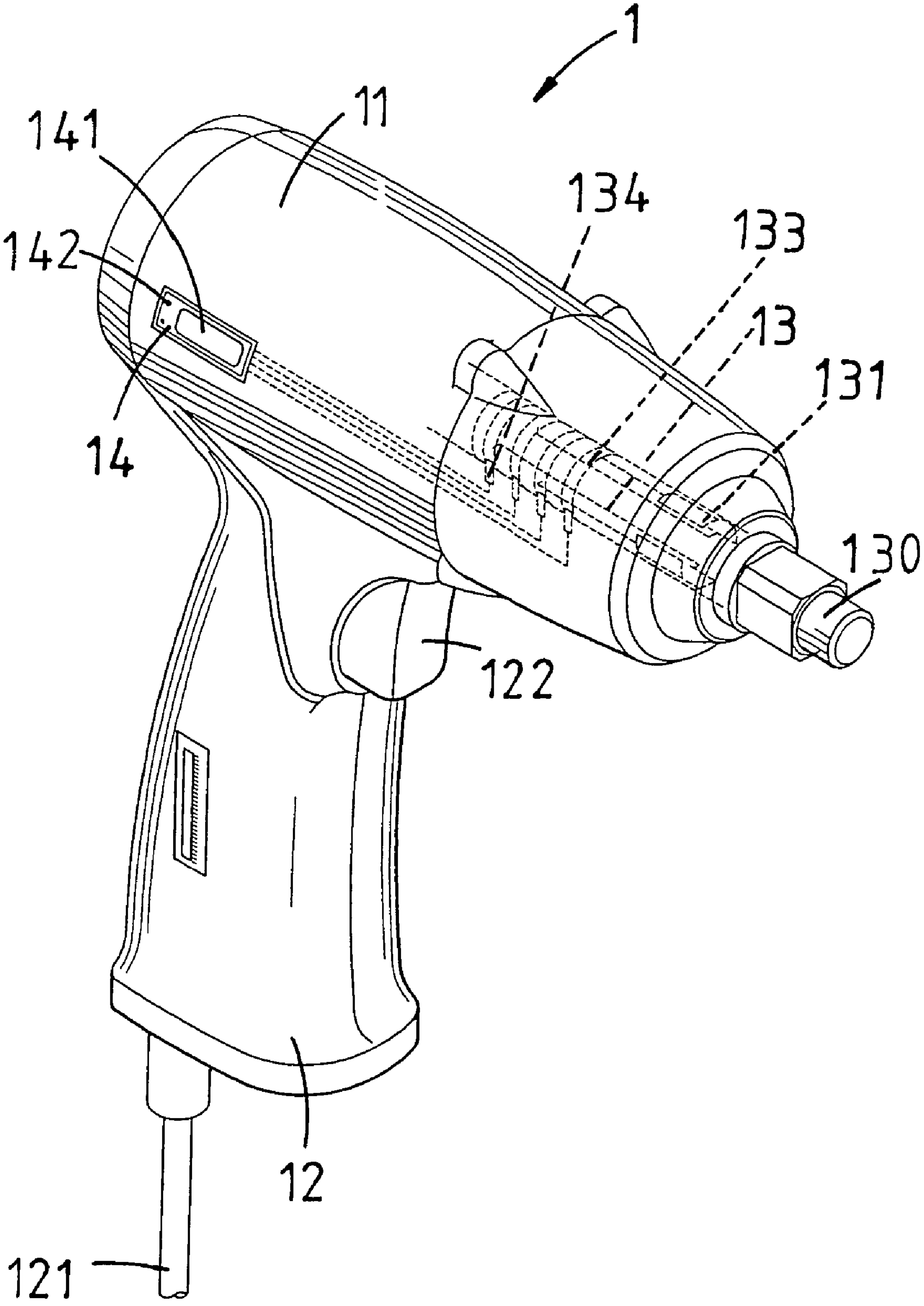
FIG. 1 is a perspective view to show the power tool with the torque detection device of the present invention.
Figure 2:
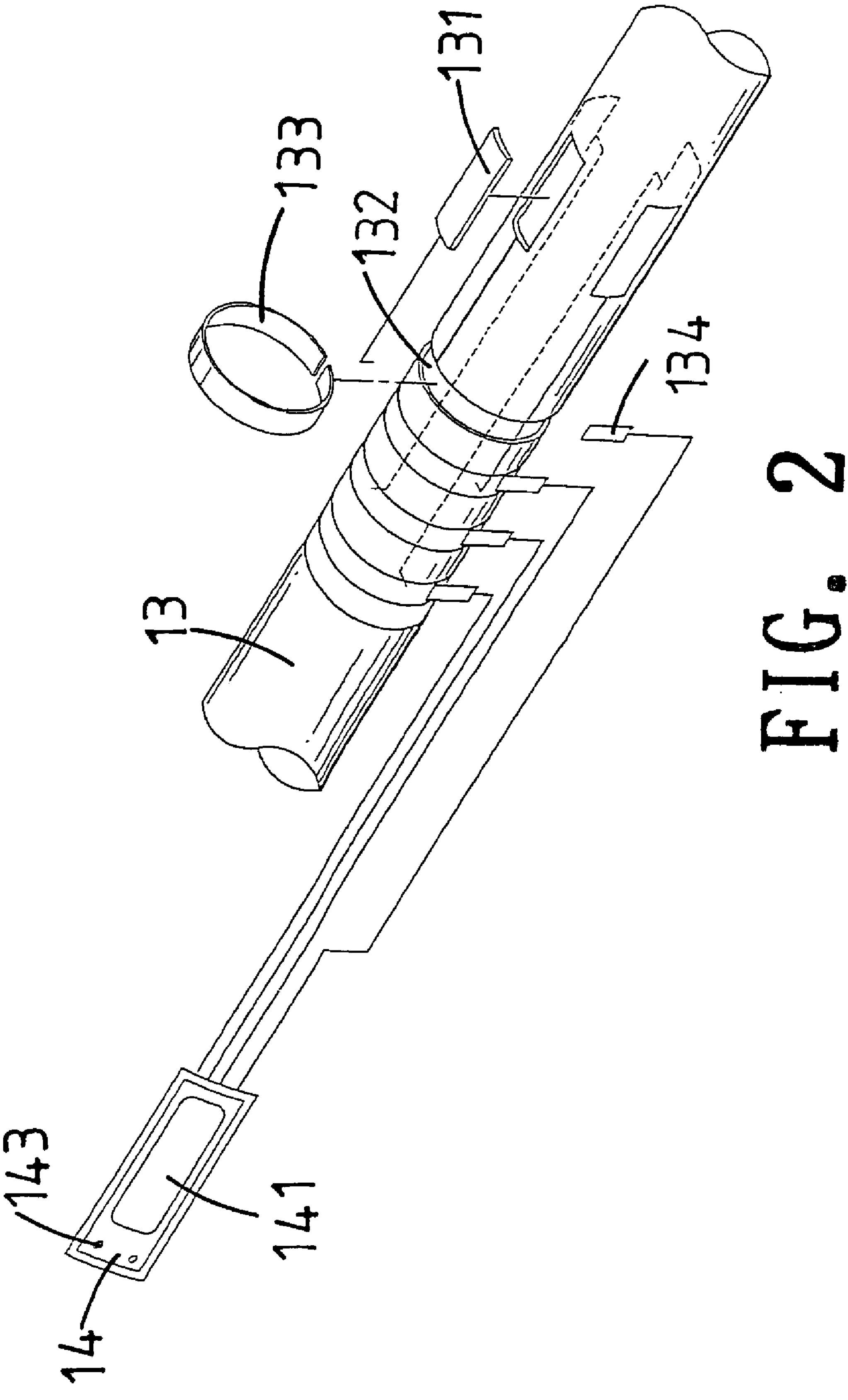
FIG. 2 shows the resistive strain gauges, the conductive collars and the signal members connected to the shaft, and the display device of the present invention.
Figure 3:
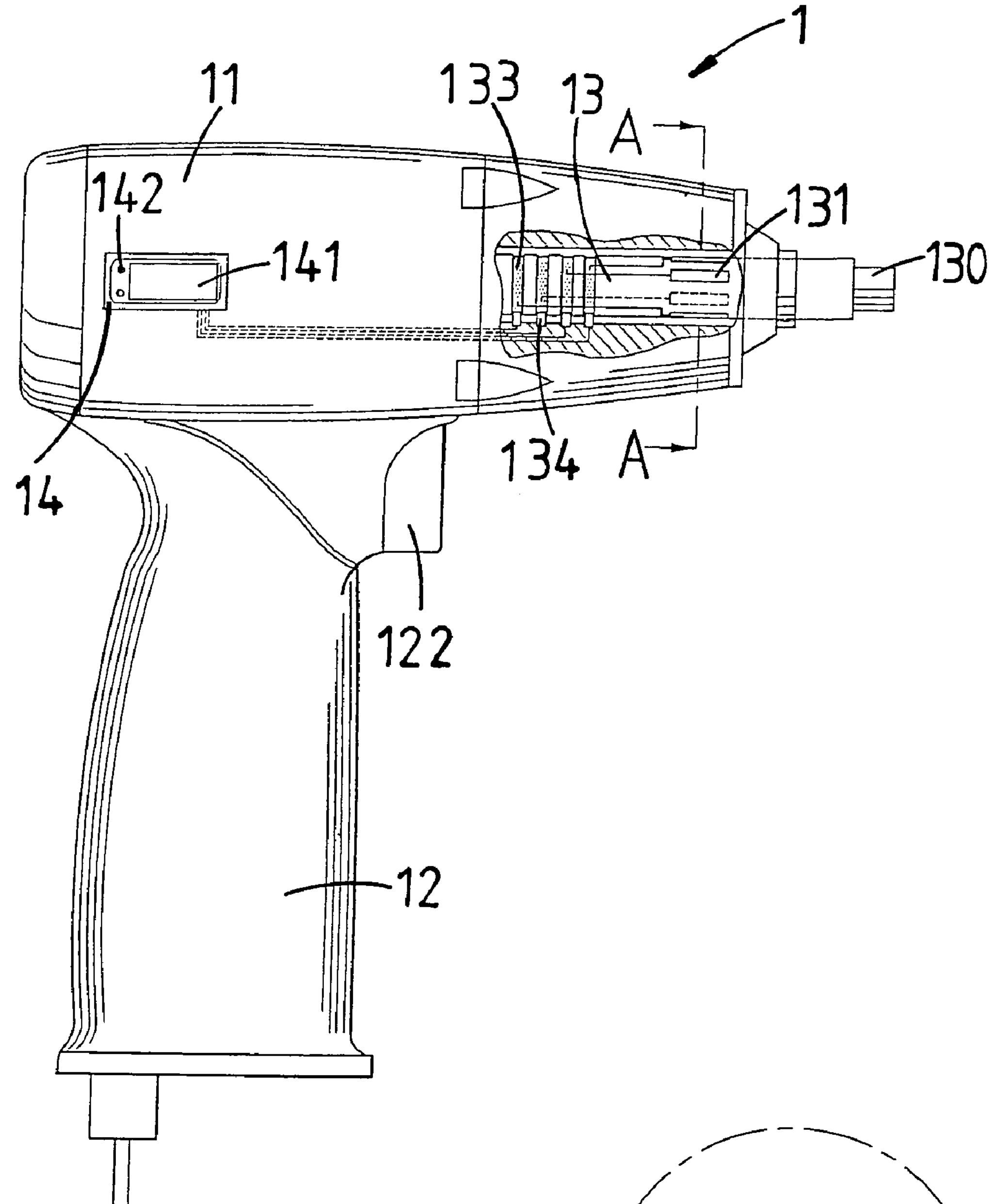
FIG. 3 is a cross sectional view to show the power tool and the torque detection device.
Figure 4:
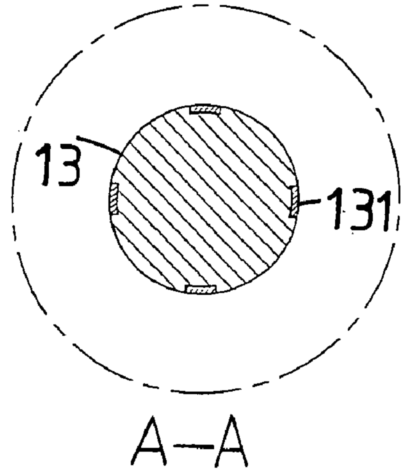
FIG. 4 shows the cross sectional view taken along line A-A in FIG. 3.

Referring to FIGS. 1 to 4, the power tool 1 of the present invention comprises a barrel 11 and a handle 12 which is connected to a power cable 121. A trigger 122 is connected to the handle 12 so as to control the electrical power to activate the power tool 1. A shaft 13 is rotatably received in the barrel 11 and driven by a motor which is not shown. A driving end 130 is located at a front end of the barrel 11 and connected to the shaft 13 so that a bit or the like can be connected to the driving end 130 which outputs a torque when rotating.

Four resistive strain gauges 131 are connected to an outer periphery of the shaft 13 and four grooves 132 are defined in the outer periphery of the shaft 13. Four conductive collars 133 made by copper are respectively and fixedly engaged with the grooves 132. The conductive collars 133 are electrically connected to the resistive strain gauges 131 respectively.

A display device 14 is located at an outer periphery of the barrel 11 and electrically connected to four signal members 134 which are electrically connected to the conductive collars 133. The display device 14 includes a display screen 141 and at least one adjustment knob 142 is located beside the display screen 141.

When the shaft 13 is rotated to output a torque from the driving end 130, the driving end 130 and the shaft 13 are deformed slightly, the resistive strain gauges 131 are deformed simultaneously. The deformation of the resistive strain gauges 131 is transferred into electronic signals which are sent to the display device 4 via the conductive collars 133 and the signal members 134. The signals are displayed in a form of digits so that the users know the exact torque that applies to the object to be tightened or loosened. By operating the adjustment knobs 143, the unit of the torque can be changed and/or the value can be set to zero when needed.

The four resistive strain gauges 131 are arranged to be a Full-Bridge arrangement so that the value of the torque can be precisely detected and displayed.

Figure 5:
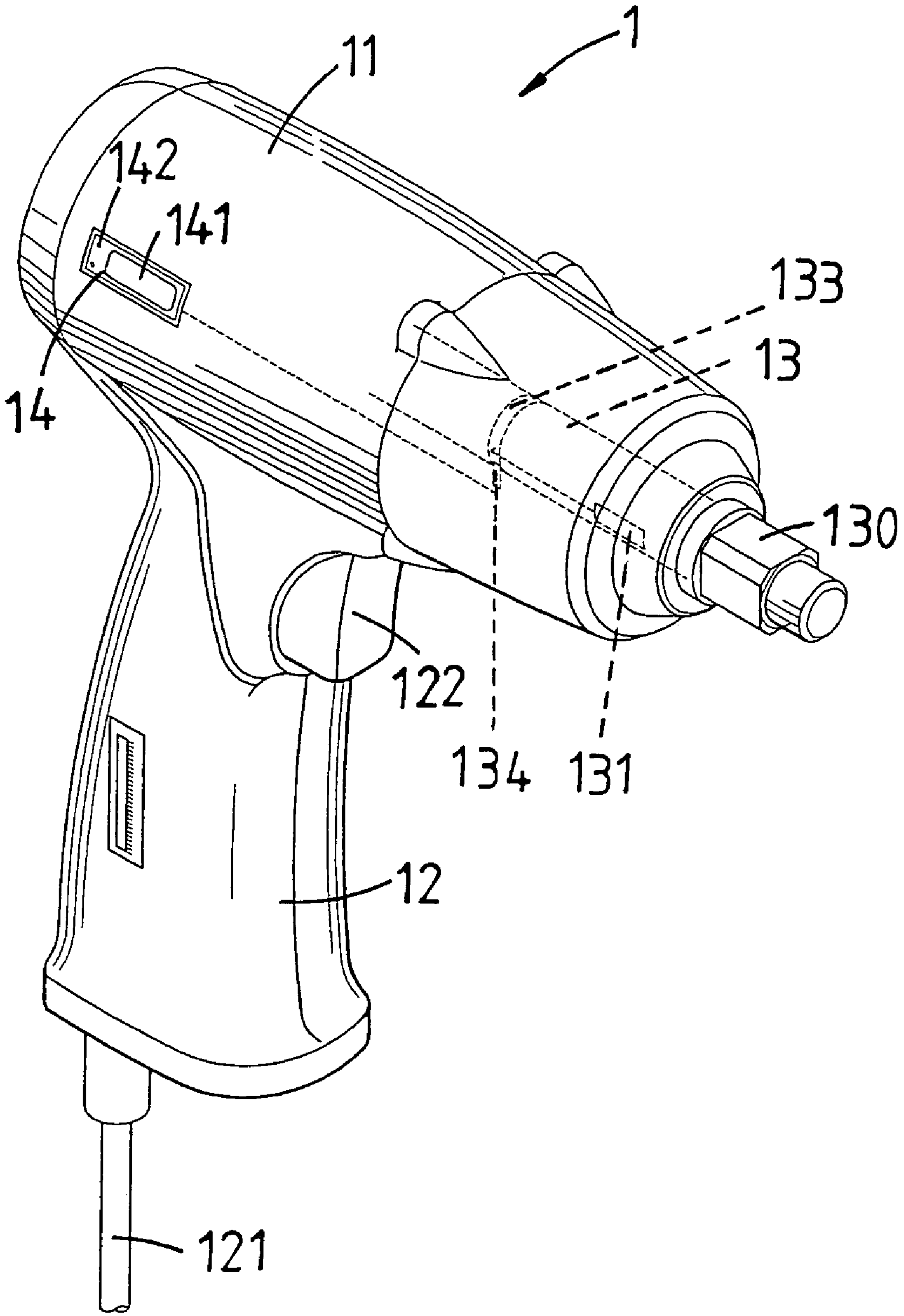
FIG. 5 shows a second embodiment of the present invention.
Figure 6:
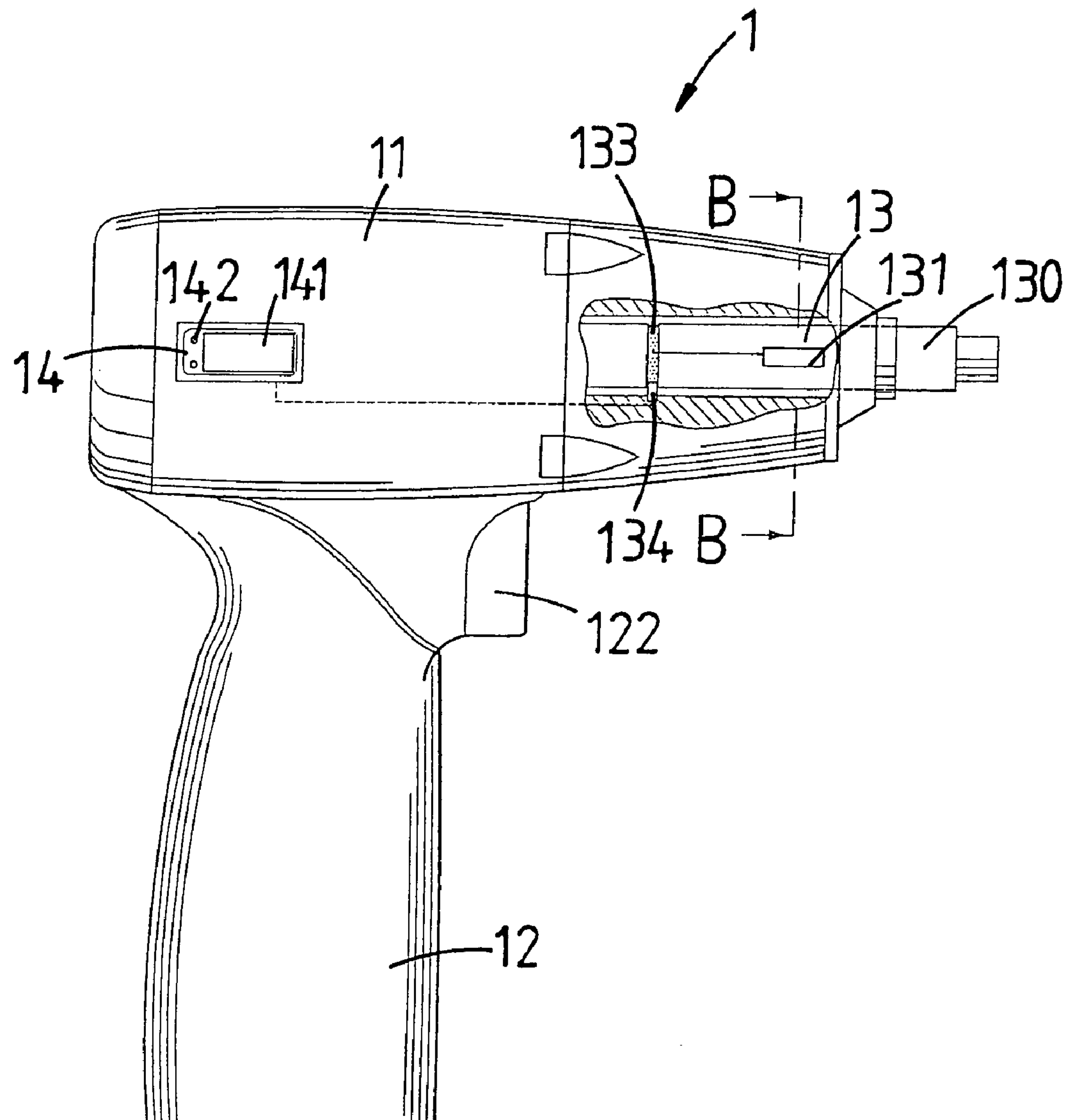
FIG. 6 shows a third embodiment of the present invention.
Figure 7:
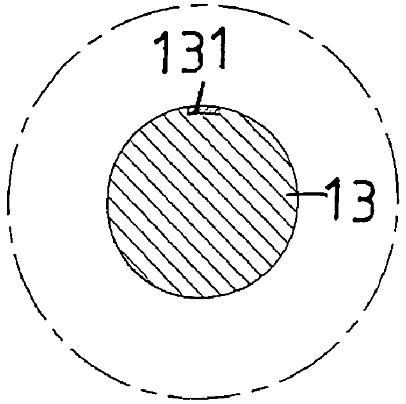
FIG. 7 shows the cross sectional view taken along line B-B in FIG. 6.

The number of the resistive strain gauge 131 and the conductive collar 133 can also be two and the two resistive strain gauges 131 are arranged to be a half-Bridge arrangement. The number of the resistive strain gauge 131 and the conductive collar 133 can be one as shown FIGS. 5 to 7, and the resistive strain gauge 131 is arranged to be a one-fourth-Bridge arrangement.

While we have shown and described the embodiment in accordance with the present invention, it should be clear to those skilled in the art that further embodiments may be made without departing from the scope of the present invention.

What is claimed is:

1. A power tool with torque detection device, comprising:

a barrel and a handle, a shaft rotatably received in the barrel and a driving end located at a front end of the barrel and connected to the shaft, the shaft including at least one groove defined in an outer periphery thereof, at least one resistive strain gauge connected to the outer periphery of the shaft, at least one conductive collar fixedly engaged with the at least one groove and electrically connected to the at least one resistive strain gauge, and a display device located at an outer periphery of the barrel and electrically connected to at least one signal member which is electrically connected to the at least one conductive collar.

2. The power tool as claimed in claim 1, wherein display device includes a display screen.

3. The power tool as claimed in claim 2 further comprising at least one adjustment knob located beside the display screen.

4. The power tool as claimed in claim 1, wherein a number of the resistive strain gauge is four and the four resistive strain gauges are arranged to be a Full-Bridge arrangement.

5. The power tool as claimed in claim 1, wherein a number of the resistive strain gauge is two and the two resistive strain gauges are arranged to be a half-Bridge arrangement.

6. The power tool as claimed in claim 1, wherein a number of the resistive strain gauge is one and the resistive strain gauge is arranged to be a one-fourth-Bridge arrangement.

* * * * *